United States Patent [19]
Gergele et al.

[11] Patent Number: 5,556,488
[45] Date of Patent: Sep. 17, 1996

[54] TIRE HAVING A PLURALITY OF INDEPENDENT REMOVABLE AND REINFORCED SECTORS

[75] Inventors: Jean Gergele, Chatel-Guyon; Armand Le Gall, Clermont-Ferrand; Jean-Pierre Pompier, Volvic; Michel Remond, Riom, all of France

[73] Assignee: Compagnie Générale des Etablissements Michelin - Michelin & Cie, Clermont-Ferrand Cedex, France

[21] Appl. No.: 284,615

[22] PCT Filed: Feb. 22, 1993

[86] PCT No.: PCT/EP93/00411

§ 371 Date: Aug. 11, 1994

§ 102(e) Date: Aug. 11, 1994

[87] PCT Pub. No.: WO93/16890

PCT Pub. Date: Sep. 2, 1993

[30] Foreign Application Priority Data

Feb. 28, 1992 [FR] France .................... 92 02483

[51] Int. Cl.$^6$ ................ B60C 3/00; B60C 5/24; B60C 15/024; B60C 15/04
[52] U.S. Cl. ............ 152/198; 152/197; 152/454; 152/333.1; 152/334.1; 152/335.1; 152/337.1; 152/338.1; 152/540; 152/544; 152/558; 156/110.1; 156/125
[58] Field of Search .............. 152/333.1–335.1, 152/337.1–338.1, 331.1, 454, 197–198, 540, 544, 558; 156/110.1, 125

[56] References Cited

U.S. PATENT DOCUMENTS

| | | | |
|---|---|---|---|
| 1,104,426 | 7/1914 | Keller et al. | 152/335.1 |
| 1,233,853 | 7/1917 | Drummond et al. | 152/334.1 |
| 1,311,806 | 7/1919 | Coats | 152/334.1 |
| 1,322,685 | 11/1919 | Franklin | 152/334.1 |
| 2,680,464 | 6/1954 | Bonmartini | 152/558 |
| 4,153,094 | 5/1979 | McKenzie . | |

FOREIGN PATENT DOCUMENTS

| | | |
|---|---|---|
| 354950 | 10/1905 | France . |
| 380768 | 12/1907 | France . |
| 1529882 | 6/1968 | France . |
| 457 | of 1913 | United Kingdom . |

Primary Examiner—Adrienne C. Johnstone
Attorney, Agent, or Firm—Brumbaugh, Graves, Donohue & Raymond

[57] ABSTRACT

The invention relates to a tire formed of a plurality of independent pneumatic sectors (S) intended to be mounted on a single rim (J) but removable individually from said rim (J), they being inflatable individually or together. The sectors (S) include at least one reinforcing armoring (4) anchored on at least one circumferential bead wire (10) in each circumferential bead, which is the bead mounted on the wheel rim (J), the reinforcing armoring (4) being radially adjacent to a reinforcement armoring (8) of the tread (2). The circumferential bead wires (10) are connected to meridian bead wires (11) located in the sidewalls (50) of the circumferentially adjacent sectors (S).

25 Claims, 7 Drawing Sheets

TIRE HAVING A PLURALITY OF INDEPENDENT REMOVABLE AND REINFORCED SECTORS

BACKGROUND OF THE INVENTION

The present invention relates to a tire formed of a plurality of pneumatic sectors mounted on a single rim and circumferentially adjacent to each other, each sector being inflated and removable so that it can be easily replaced in the event that it is damaged. The invention also relates to the assembly consisting of the tire and a mounting rim which is adapted to the sectors of said tire.

Although all types of tires can be concerned, it is known that it is the tires for construction equipment used in open-cut or underground mines and construction sites of all types which are subject to numerous types of aggressive action by the ground. They, therefore, more than any other tire, require frequent removal, repair, and remounting, unless they are to be considered scrap and, in the worst case, discarded before they have are worn. As the dimensions of the tires concerned are the largest and are furthermore increasing all the time, the problems have become worse: the removal, repair, and remounting require larger and larger and more and more costly means.

Furthermore, for their manufacture such tires require equipment which is becoming immense, whether for building, curing, or maintenance, while the storage areas required are becoming excessive. In view of the increase in the existing dimensions which are desired by the manufacturers and users of construction equipment, another problem exists, namely that of the transporting of such tires.

The principle of manufacture of a tire made of several inflatable sectors which are independent from each other and can be removed individually from the rim, is widely known in the prior art and mention may be made of U.S. Pat. Nos. 1,233,853, 1,311,806, 1,322,685 and 4,153,094. These patents, most of which are now old, concern either closed pneumatic sectors, or systems permitting these sectors to be air-tight. U.S. Pat. No. 4,153,094, in particular, describes a system of attachment in which a circular bead wire reinforces the circular bead of a pneumatic sector. This bead wire being pierced with holes along its periphery, the sector is then attached by screwing to a plate which, in its turn, is fastened to a flat rim.

SUMMARY OF THE INVENTION

The present invention meets a twofold concern. First of all, the inflatable removable sectors must withstand the aggressive action of the ground, whether individually or as a whole. As a matter of fact, upon travel, several sectors are simultaneously loaded and in contact with the ground: a certain coherence between sectors is necessary in order for the forces to be distributed over all the sectors concerned. Secondly, the removable sectors must have a structure such that their mounting on the rim and removal from it is easy and rapid.

Thus, in accordance with the invention, the tire formed of several identical inflatable, removable pneumatic sectors which are circumferentially adjacent when mounted on a suitable rim with circularly continuous base, is characterized by the fact that each sector, which has a height on rim (H), a meridian width (B), and a circumferential width (C) comprises a tread connected to four sidewalls, two of these sidewalls being circumferentially adjacent to the sidewalls of the neighboring sectors and the other two forming the sidewalls of the tire, these sidewalls terminating respectively in meridian beads not connected to the mounting rim and reinforced by meridian bead wires and by circumferential beads which assure the mounting of the sectors on the rim and are reinforced by circumferential bead wires connected to the meridian bead wires and to which at least one reinforcing armoring of non-stretchable cords or cables is anchored, said reinforcing armoring being radially adjacent, at the top of the sector, to at least one reinforcement armoring of the tread.

The reinforcing armoring may be formed of at least one ply of radial cords or cables, that is to say in planes containing the axis of rotation of the tire. It may also advantageously be formed of at least two plies of cords or cables parallel to each other in each ply and crossed from one ply to the next.

By radially adjacent, it is to be understood that the reinforcement armoring of the tread can be disposed either radially above the reinforcing armoring or radially below the reinforcing armoring.

The reinforcing armoring is anchored to the circumferential bead wires, referred to as mounting bead wires; by the expression "anchored" it is to be understood that it can be wound around these circumferential bead wires forming turn-ups, as known per se, but that it can also be connected to these circumferential bead wires by other means and, to particular advantage, by means of an additional reinforcing ply or plies wound around the circumferential bead wires and between the edges of which the edges of the radial ply are inserted.

Preferably, the additional reinforcing plies are formed of cords or cables which form a small angle of between 30° and 60° with the circumferential direction of the tire.

In the case of a radial reinforcing armoring, it may be advantageously formed of a single cord or cable which is wound around two circumferential bead wires respectively, which makes it possible advantageously to avoid all damage due to inter-ply shearing, while assuring excellent anchoring.

Seen in a radial plane, the meridian profile of the reinforcing armoring has two points of intersection, located symmetrically on both sides of the equatorial plane, with the meridian profile of the reinforcement armoring of the tread. It is advantageous for these points of intersection to correspond to the axial ends of the reinforcement armoring and for the meridian profile of the reinforcing armoring to have, at these points, tangents forming with the axis of rotation of the tire assembly angles ($\phi$A) such that $$\frac{R_A^2 - R_E^2}{2R_A} \tan \phi = \lambda$$

when the sector is mounted on a rim and inflated to its operating pressure, $R_A$ being the radius of the points (A) of intersection between the meridian profile of the reinforcing armoring and the meridian profile of the reinforcement armoring of the tread, $R_E$ being the radius of the point E of the meridian profile of the reinforcing armoring furthest axially from the equatorial plane of the tire assembly, and $\lambda$ being the width, measured axially, of the reinforcement armoring of the tread. It is then particularly advantageous, in order for this meridian profile to be as stable as possible, that the reinforcing armoring be arranged radially, in the region of the top of the sector, above the reinforcement armoring of the tread, which reinforcement armoring has a high meridian stiffness in flexure. By meridian stiffness in flexure, there is understood the ratio $$F / \frac{e}{L}$$

if F is the force necessary in order to obtain the sag (e) of a fixed reinforcement armoring of a circumferential length of one and axial width L. This meridian stiffness of flexure will be termed high if it is at least equal to 350 daN per mm of circumferential length.

The reinforcement armoring of the tread can be formed of one or more reinforcement layers, formed of plies of cords or cables or blades of textile, plastic or metal, oriented with respect to the circumferential direction of the assembly of the sectors along zero, right, acute, equal or different angles, the number of these rubberized plies being a function of the resistance of the armoring thus formed. There may also be concerned plates of composite plastic material, that is to say a layer of plastic material in which short or long fibers are included. The plates may also be formed of plastic alone, not reinforced, or of metal, and they can be used alone or in addition to the ordinary plies of cords or cables.

The two meridian bead wires which reinforce the meridian beads are bead wires present in meridian or radial planes of the tire which is formed by the adjacent sectors, said meridian or radial planes being planes containing the axis of rotation of the tire, the two circumferential bead wires being in planes parallel to the equatorial plane and perpendicular to the axis of rotation of the tire formed by the sectors. The meridian bead wires and the circumferential bead wires are not independent of each other, but are connected together.

The sidewalls of sectors circumferentially adjacent to each other, or intersector sidewalls, can be formed of a simple vulcanized rubber. They will preferably be reinforced by a carcass armoring of at least one ply of non-stretchable cords or cables, the edges of which ply will be anchored to the meridian bead wires.

This carcass armoring is an armoring the non-stretchable cords or cables of which follow a trace along a given profile extending from a meridian bead wire to the circumferentially opposite meridian bead wire. The assembly of cords or cables can cover the entire surface, which is not a surface of revolution, contained between the meridian bead wires and the circumferential bead wires. However, the carcass armoring may also be partial, the cords or cables covering only a surface contained between the meridian bead wires and two planes parallel to the equatorial plane of the tire, at equal distance from said equatorial plane and closer to said plane than the planes containing the circumferential bead wires. The two above-mentioned planes will advantageously be the two planes defining the axial width of the reinforcement layer or layers of the tread.

The carcass armoring may be formed of two plies the cords or cables of which are crossed from one ply to the next, forming an angle at most equal to 45° with respect to the equatorial plane of the tire, and in the meridian plane circumferentially separating a sector into two identical parts. It is advantageously formed of a single ply the cords or cables of which are then contained in planes perpendicular to the two meridian bead wires of the sector. The cords or cables constituting this armoring are turned-up around meridian bead wires so as preferably to form a turn-up at constant height.

The tire sectors which are reinforced in this manner can be inflated individually by means of suitable, individual inner tubes of appropriate shape in a number equal to the number of sectors, or then be inflated as a whole with or without inner tube; in the latter case, we have an assembly of so-called "tubeless" sectors, each sector being then covered on the inside by a layer of vulcanized rubber which has the property of being impermeable to the inflation gas of the tire, such as air.

In the case that all of the sectors are inflated to the operating pressure by means of a single inner tube, the latter can, in simple manner, be of toroid shape or else a tube which is constricted meridianly by a reinforcement in the form of a cord, cable, bead wire or narrow ply, at several circumferentially equidistant places. Such a single inner tube may be circumferentially continuous but it may also be discontinuous, that is to say, have two closed ends.

If one calls Rs (FIG. 2a) the distance between the axis of rotation of the tire formed by the sectors and the point of the reinforcing armoring of a sector furthest from said axis, and Rm the distance between the same axis of rotation and the point of a meridian bead wire furthest from said axis, the difference Rs–Rm will preferably be between 0.1(Rs–Rc) and 0.5(Rs–Rc) in the event an inner tube is used for the inflation to the operating pressure and at least equal to 0.2(Rs–Rc) in the event that the assembly of sectors is inflated without inner tube, Rc being the radius of the circumferential bead wires of the sector. These variants permit an advantageous good continuity of travel of the sectors, avoiding any damage to individual inner tubes in the first case and permitting tightness of the sectors in the second case, the facing meridian bead wires of two adjacent sectors being adjacent to each other except for the thicknesses of rubber. In the case of the inflatable assembly without inner tube, the meridian side sidewalls respectively of the two adjacent sectors are in contact, at the junction of the two sectors, over a substantial height (h) which is equal to at least 0.3(Rs–Rc), which height (h), measured perpendicularly to the axial extent of the meridian bead-wires, is preferably substantially constant on the meridian sidewalls of the sectors.

The meridian bead wires are advantageously unstretchable under tensile stress and are of low stiffness in flexure in their planes, that is to say in the presence of a moment of flexure exerted in their planes.

This low stiffness permits changes in curvature of the meridian bead wires of bead wires without generating internal stresses of stretching and compression which are harmful for the said bead wires, which will advantageously be formed of an assembly of cords or cables braided together or obtained by winding a cord or cable so as to form several turns. As for the circumferential bead wires, they are preferably non-stretchable and of great stiffness in flexure. These circumferential bead wires can be formed of rods, tubes or bands of steel, with circumferential ends which are curved or turned up on themselves.

Two meridian bead wires and two circumferential bead wires can form a single bead wire. Such a bead wire is then obtained, for instance, by the braiding of cords or cables on the portions of tubes, rods or bands in order to form the circumferential portions and the braiding alone to form the meridian portions. It may also be obtained by the assembling of several turns of cords or cables and the passage to the inside of the tube portions, or the assembling with the circumferential rods or bands and clamping by collars.

Preferably, the circumferential bead wires will be connected firmly to the mounting rim by suitable means, other than the rim and the beads.

In order that the junction between two adjacent sectors offers good resistance to the penetration of pebbles or different objects and to the consequences of such penetration, in order to favor the tightness of the assembly, it is advantageously for the sidewalls respectively of two adjacent sectors which face each other to be provided, in the case of one of them, with a groove having on the said sidewall either a continuous curved trace or preferably an undulated or zig-zag trace, and, in the case of the other, with the corresponding protrusion so that the latter fits in the groove of the facing sidewall.

The junction, the coherence between two adjacent sectors, can advantageously be improved by placing on the meridian face of one of the adjacent sectors a layer of self-vulcanizing rubber mix, that is to say, vulcanizable at room temperature, of slight thickness equal to at least 2 mm. In order to be able more easily to separate a sector from its immediate neighbor, this layer will advantageously be reinforced by a steel wire arranged in a spiral in the plane of the layer with a visible end, which makes it possible, by pulling on said wire, to tear the intersecting layer of mix, in accordance with the principle described in French Application 91/06255 of May 23, 1991.

The layer of rubber mix thus used can cover the entire meridian face of the sector, or cover only a portion of said face and in particular the meridian face, either of the protrusion or of the groove present on the sidewall of a sector.

The sectors thus produced are mounted on a single monobloc rim. In order to facilitate the handling of the sectors and in particular facilitate their mounting and removal, the mounting rim has rim flanges which extend either radially towards the inside in the direction of the axis of rotation or radially towards the outside. In the former case, the flanges are made circumferentially discontinuous by the presence of recesses, the flanges permitting the putting in place of the beads formed around circumferential bead wires, the bead wires placing themselves in position axially to the inside of the rim flanges.

Preferably, in known manner, the rim flanges have rounded outer contours so that the carcass armoring and the additional plies come in place on the flanges without creating a concentration of stresses.

In the latter case, that is to say the case in which a rim having flanges which are turned radially towards the outside is used, two options may be present. The first concerns the use of a rim satisfying the standards approved with flanges the rounded tips of which are generally axially to the outside of the vertical walls of the flanges. The mounting of the circumferential beads of a sector then takes place by firm attachment. The second option concerns the use of a rim with flanges having tips the ends of which are turned axially towards the inside, these tips together with the rim seats thus forming embedment grooves for the mounting of beads of corresponding shape of each sector.

BRIEF DESCRIPTION OF THE DRAWINGS

The characteristics, advantages and embodiments of the present invention will become more clearly evident from the description given below with reference to the accompanying drawing, in which.

DESCRIPTION OF THE PREFERRED EMBODIMENTS

Figure 1:
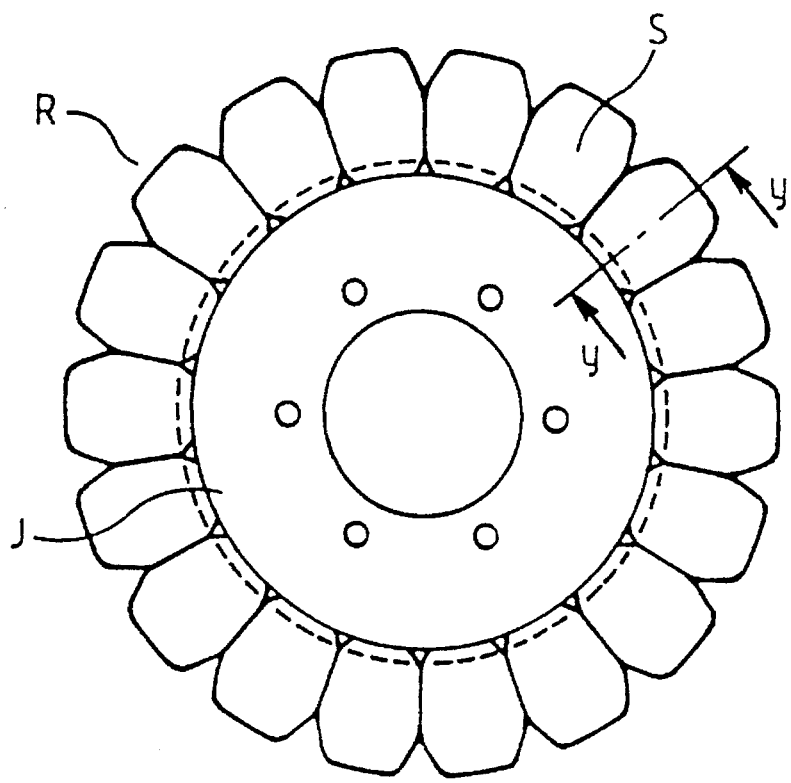
FIG. 1 shows the rolling assembled formed of pneumatic sectors mounted on a rim.

FIG. 1 shows a wheel R provided with a rim J on which eighteen circumferentially adjacent sectors S are mounted to form a tire of size 18.00 R 33, which tire is generally used for the travel of construction trucks. These sectors S are independent from each other and individually inflatable, the number of inner tubes being equal to the number of sectors, which can be mounted and removed individually.

In a first variant of the invention, each sector S (FIGS. 2a and 2b) of height on rim H, meridian width B, and circumferential length C comprises a single bead wire 1, the resultant of the junction of two circumferential bead wires 10 and two meridian bead wires 11. The circumferential bead wires 10 are formed of steel tubes which are bent at their ends 12 in which there are arranged several steel wires, each wire being coated with a layer of vulcanized rubber, this assembly being referred to as a "package".

Figure 6:
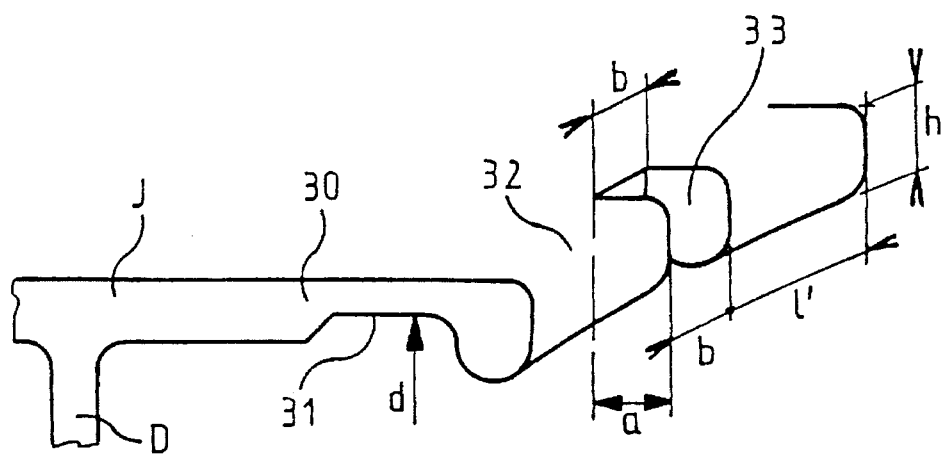
FIG. 6 shows a mounting rim intended to receive the assembly of sectors according to FIGS. 2a and 2b.

The steel tubes have a circumferential length l at most equal to the circumferential distance l' separating the respective two walls of the recesses 33 provided in the rim J for the mounting of the sectors S (FIG. 6). The steel wires are extended to form the meridian bead wires 11, which are less rigid than the circumferential portions.

The meridian bead wires 11 of the bead wire 1 serve for the anchoring of a ply 5 of unstretchable textile cords of rayon. These cords are in planes perpendicular to the two meridian portions 11 of the bead wire 1.

The anchoring of the ply 5 is effected by winding said ply around portions 11 forming turn-ups 51. Radially to the inside of the ply 5 there is the reinforcement ply 4 of non-stretchable steel cables which, under a force equal to 10% of the breaking load, have a relative elongation at most equal to 0.2%. This ply 4 has a width L, measured at the level of the portions 10 of the bead wire 1, equal to 131.7 mm and to l. The variant described shows edges 41 of the ply 4 which are not turned up around circumferential portions 10 but are anchored by adhesion by means of the additional ply 7 of metal cables wound around portions 10 so as to present two turn-ups 70 and 71 between which the edges 41 of the ply 4 are inserted. The metal cables of the ply 7 are inclined by an angle of 45° with respect to the circumferential direction of the tire formed by the sectors S.

A reinforcement or crown armoring 8 formed of two plies of non-stretchable metal cables, that is to say cables which under 10% of their rupture load have an elongation at most equal to 0.2%, and of a uniform steel plate of a thickness of 2 mm completes the assembly of the reinforcements. The metal cables form angles of 45° with the circumferential direction and are coated with a calendering mix of high modulus of elasticity of extension. This reinforcement armoring 8 has a stiffness to meridian flexure equal to 420 daN per mm of circumferential length.

The assembly of the armorings 4, 5, 7, 8 is covered by a tread 2 having grooves 9, sidewall rubber 40 and 50, and bead protective rubber 6.

Figure 2A:
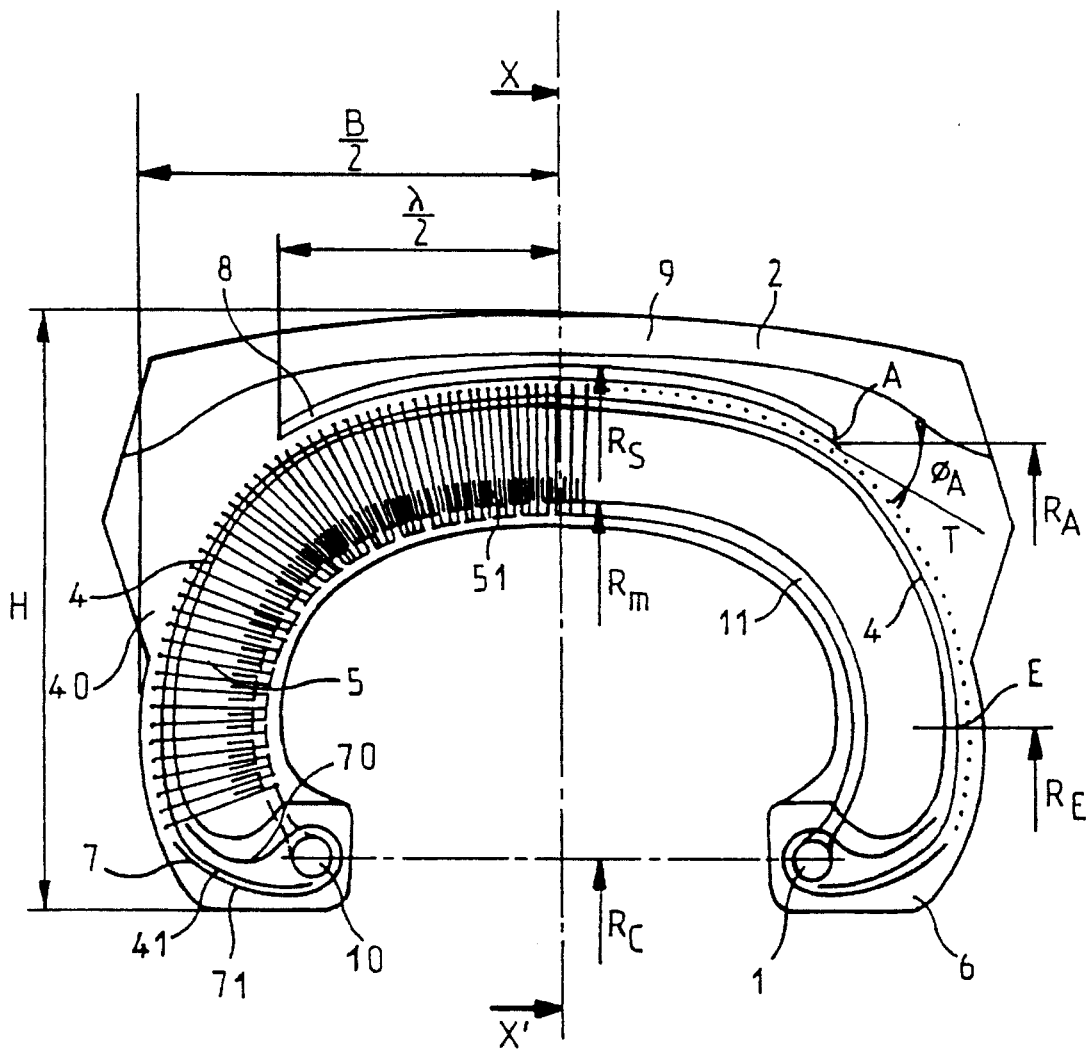
FIG. 2a shows, seen in section along the line YY of FIG. 1, one of the sectors forming the tire, with beads provided with a single bead wire.

On the right-hand side of FIG. 2a, simplified, at the point A of intersection between the meridian profile of the reinforcement armoring 8 of axial width λ and of the reinforcing armoring 4, the tangent T to the said meridian profile of the armoring 4 forms with a line parallel to the axis of rotation of the assembly passing through A, an angle φA such that $$\frac{R_A^2 - R_E^2}{2R_A} \tan \phi = \lambda$$

$R_A$ and $R_E$ being, as shown in FIG. 2a, the radii of the point A and of the point E respectively of the reinforcing armoring 4 furthest axially from the trace of the equatorial plane XX'.

The mounting rim J of the sectors S of the first variant, such as described above and shown in FIGS. 2a and 2b, comprises diagrammatically (FIG. 6) a disk D, a rim bottom 30, seats 31, and flanges 32, these flanges 32 being circumferentially discontinuous. The recesses 33 have the following dimensions: The depth a is equal to the axial width of the rim flange and to 50 mm, namely substantially 0.06 d, d being the diameter of the rim seat; the circumferential width b is equal to 28 mm, namely substantially 0.035 d; the height h of a rim flange is equal to 50 mm.

By comparison to an assembly formed of the tire and a rim having flanges directed towards the axis of rotation of the tire, we can state that we have a sector with reversed hooking, the circumferential beads of the sector S which are reinforced by the bead wires 10 coming into position on the seats 31 of the rim J radially on the inside.

Figure 3A:
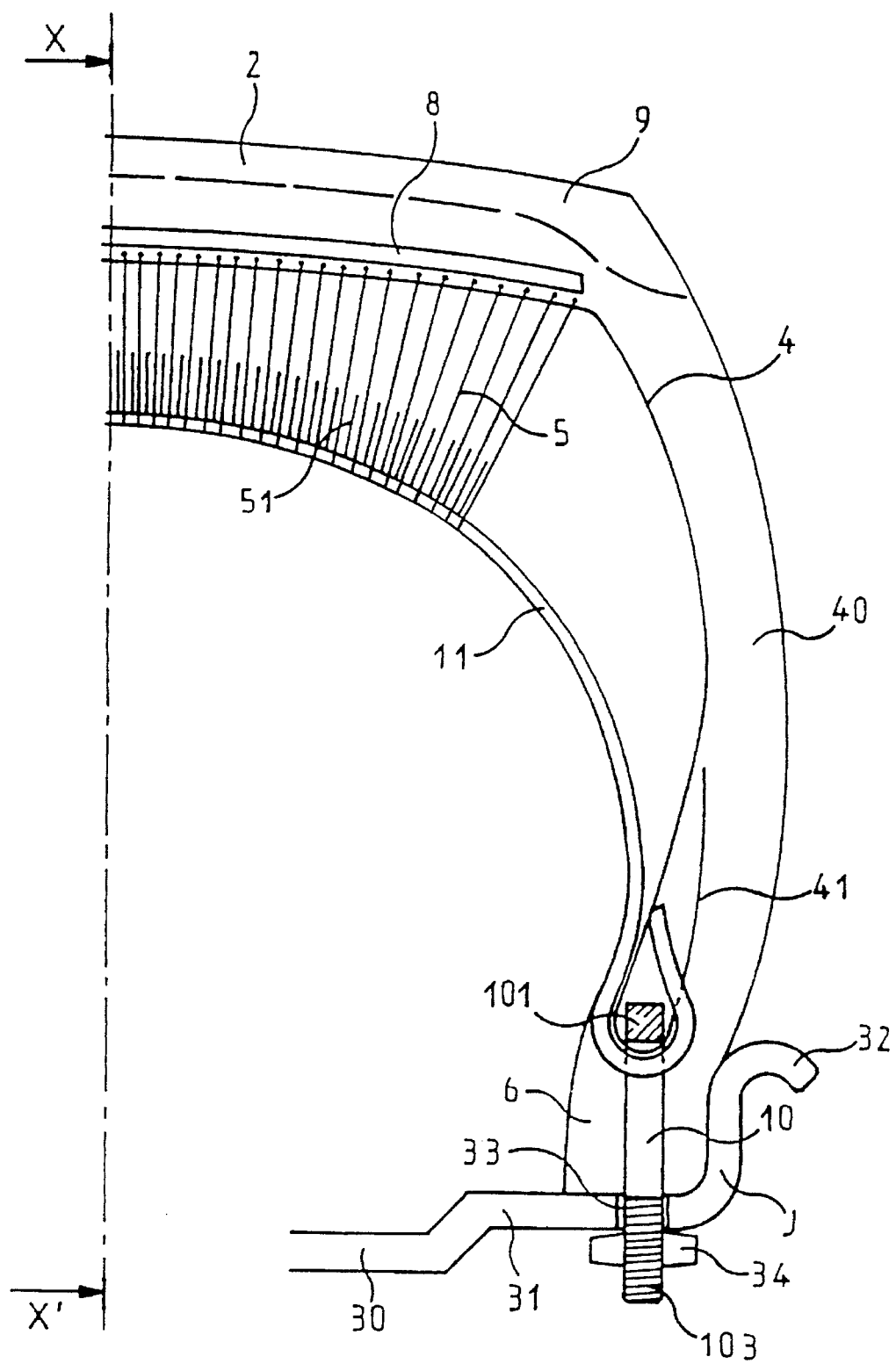
FIG. 3a shows, seen in section along the line YY of FIG. 1, sectors forming the tire with circumferential bead wire portions in the form of "riders" permitting a firm attachment to the rim.
Figure 2B:
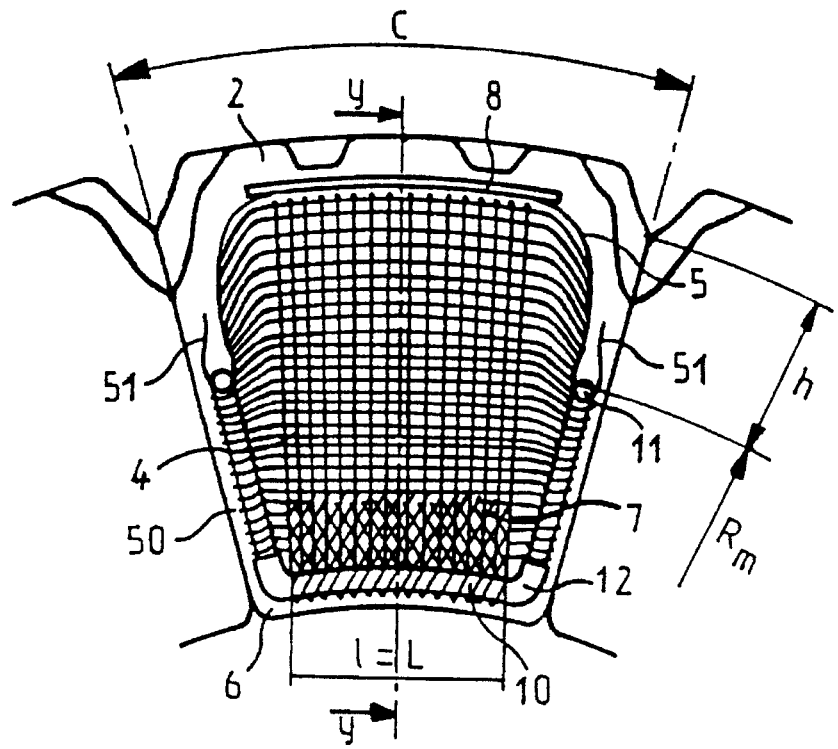
FIG. 2b shows, seen in section along the line XX of FIG. 2a, one of the sectors of the tire not mounted on a rim.
Figure 3B:
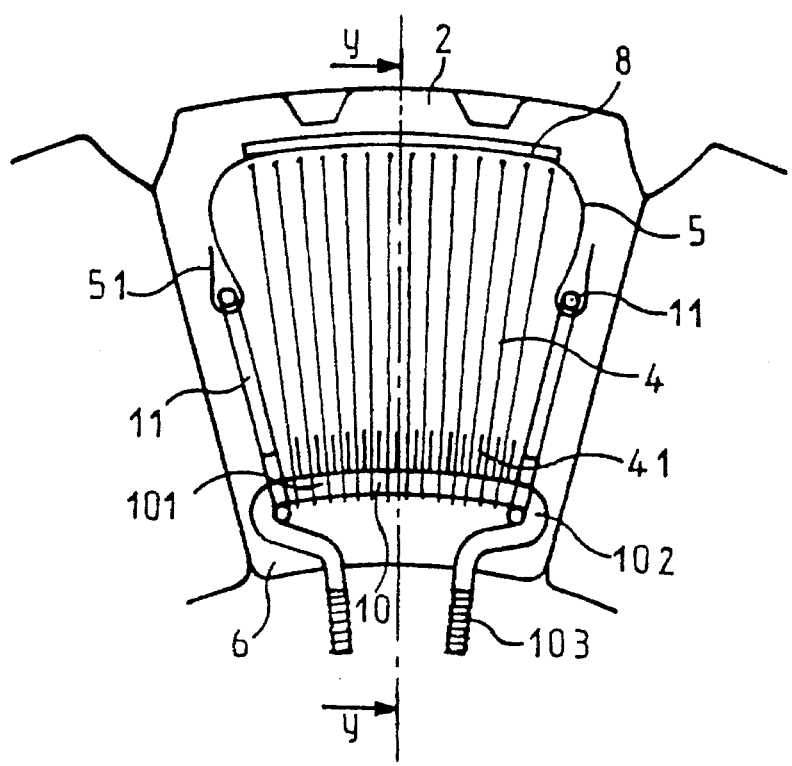
FIG. 3b shows, seen in section along the line XX of FIG. 3a, one of the tire sectors not mounted on a rim.

The tire sector S shown in FIGS. 3a and 3b differs basically from that shown in FIGS. 2a and 2b only by the construction of the bead wires reinforcing the beads of the sector. The circumferential bead wires 10 are formed of brass-coated steel bands 101 or tubes, turned on themselves radially to the inside, the turn-ups 102 being themselves bent in such a manner that the bands terminate in straight cylindrical portions 103. These portions 103 are threaded and permit the firm attachment to the mounting rim of the sector S by means of nuts 34.

As to the rim J which is intended to receive the sectors S of the second variant, as they have been described above and shown in FIGS. 3a and 3b, its flanges 32 are radially to the outside of the rim bottom 30 and the seats 31 (FIG. 3a) and have edges which extend axially toward the outside, that is to say as in the case of a normal rim. The seats 31 are, however, provided with orifices 33 intended for the passage of threaded rods 103 corresponding to the circumferential bead wires 10 or "riders". The nuts 34 permit the firm attachment, while being simple.

Figure 4:
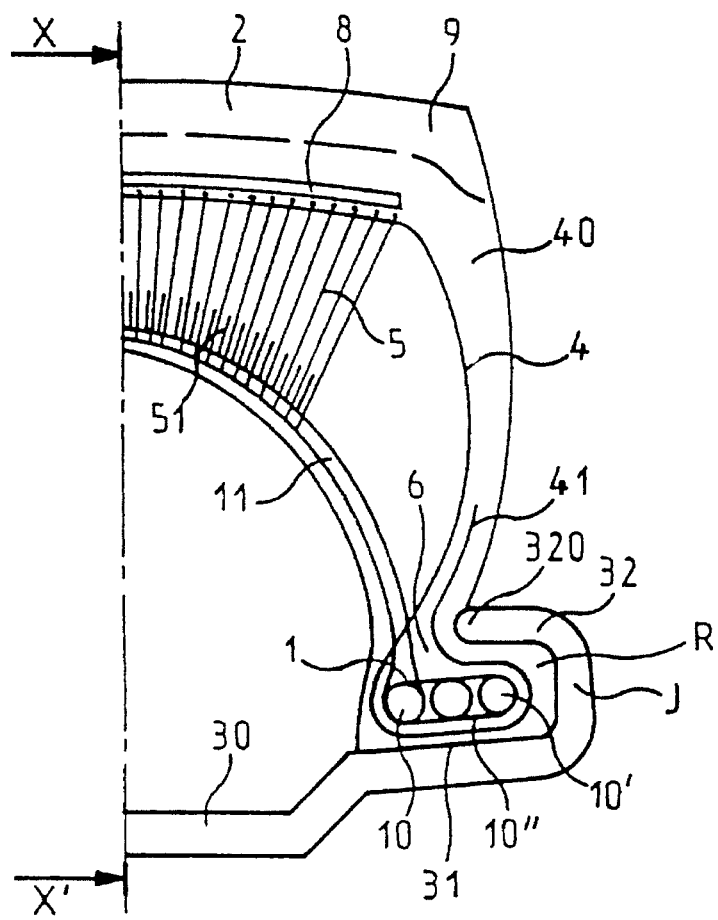
FIG. 4 shows a variant bead of a sector (3), mounted on a rim the flanges of which are rounded axially towards the inside.

The third variant, shown in FIG. 4, differs from the preceding ones by the system of attachment to the rim J and by the rim J itself. The system of attachment comprises a bead wire 1 comprising the circumferential portions 10 and the meridian portions 11. Adjacent to the circumferential portions 10 there are two circular bead-wire portions 10' held fixed to the circumferential portions 10 by collars 10". Around this system the reinforcing armoring 4 is turned up to form turn-ups 41. Such a system of attachment permits the fitting of the beads 6 in the embedment groove R of the rim J formed on the one hand by the rim seats 31 and the flanges 32 turned radially toward the outside with tips (320) which are rounded axially towards the inside, that is to say towards the axis XX'.

Figure 5A:
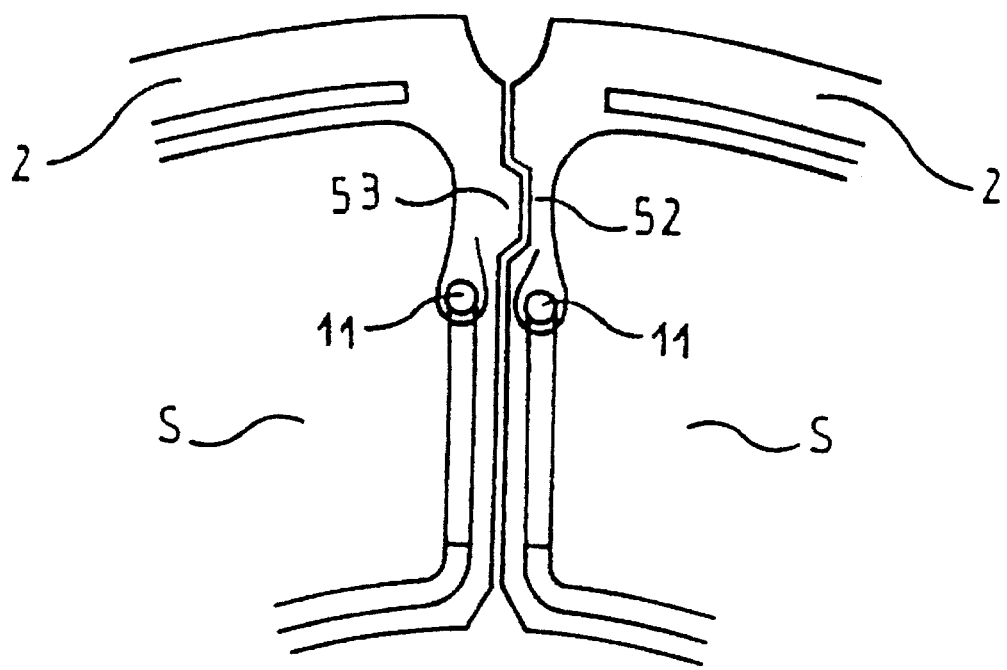
FIG. 5a shown, seen in the equatorial plane of the tire, two circumferentially adjacent sectors with sidewalls having grooves and protrusions.
Figure 5B:
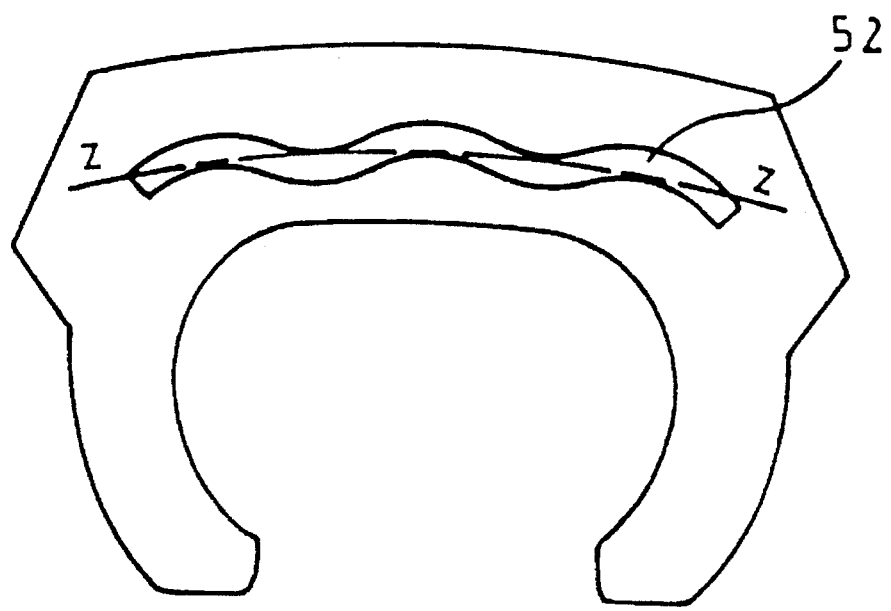
FIG. 5b shows the same variant, looking at a sector sidewall.

FIG. 5a shows the two sidewalls 50 of two adjacent sectors S which are face-to-face. One is provided with a groove 52 the trace of which, seen on the sidewall (FIG. 5b) is a sinusoid the center axis of which is curved. The other is provided with a protrusion 53 having the same trace on the sidewall as the groove 52 on the facing sidewall and the dimensions of which are such that the said protrusion 53 fits perfectly and without effort in the groove 52. Although the grooves of protrusion are shown only in the upper part of the intersecting sidewalls it is obvious that groove and protrusion can be extended in the side portions of these sidewalls.

Figure 7A:
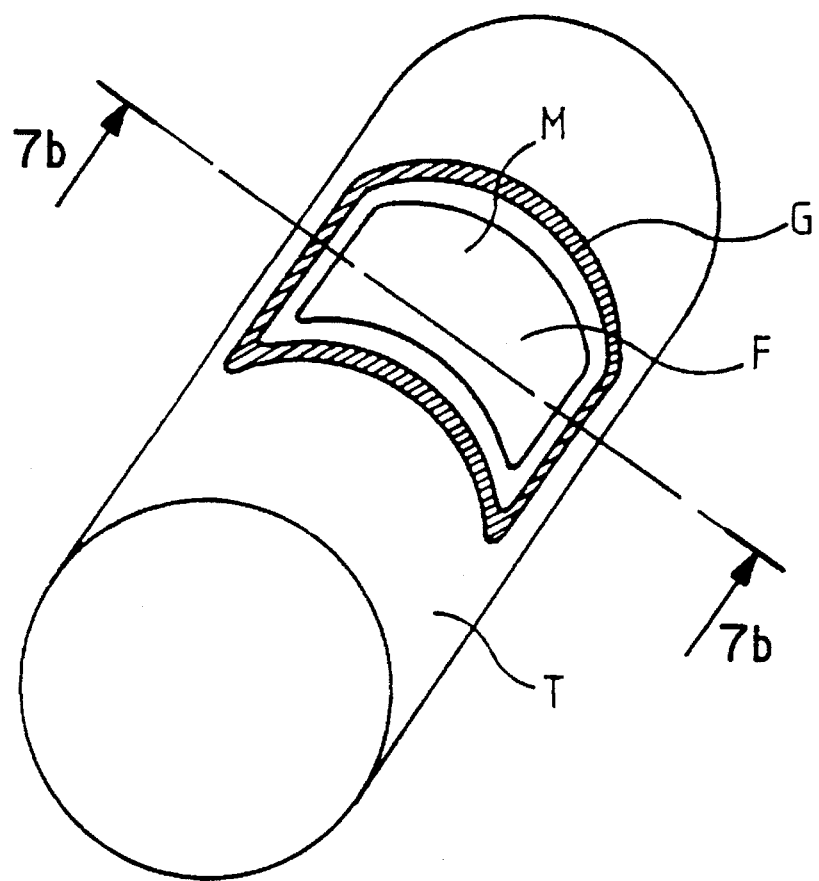
FIG. 7a shows, very diagrammatically, a building drum intended for the production of a sector.
Figure 7B:
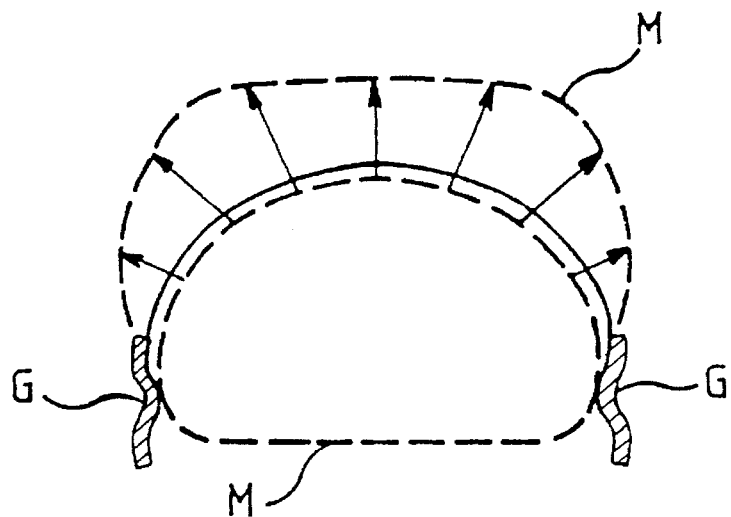
FIG. 7b is a view of FIG. 7a along the section plane 7b—7b.

FIG. 7a shows, very diagrammatically, a building drum T intended for the production of a sector S provided with a single bead wire 1. This cylindrical drum has the feature that it is provided with grooves G intended for the positioning and clamping of the bead wires 1 on the drum which is non-circular but has a configuration adapted to that of the bead wire 1 of the sector S. These grooves G surround a window F within which there is deformable membrane M (FIG. 7b). This membrane M can be reinforced in itself so that, under the effect of the cambering pressure, it imparts the desired configuration to the reinforcing armoring, possibly the carcass armoring placed initially on the drum T. The membrane M can also be deformed by the combined action of the cambering pressure and a metal support located radially to the inside of the membrane.

The method for producing a tire sector, given by way of example, consists in placing the bead protector rubbers, the additional plies 7 if any, possibly the cable armoring 5 and the necessary filler rubbers on the building drum, briefly described above, and then cambering the assembly formed in this way. The radial cable armoring 4 is then placed on before the turning up of the additional plies 7 around the bead wires 1. The sector is then completed by the placing-on of the sidewall rubbers and of the reinforcement layer or layers 8 of the tread 9. The raw body thus produced is then vulcanized in a curing mold of suitable shape.

A second possible manner of producing a sector S consists in using a hard core, whether or not provided with spacers, on which there are disposed the reinforcement elements of the reinforcing ply 4 and the reinforcement elements of the carcass armoring 5, the plies or armoring being provided with their respective bead wires. This core is placed in a suitable mold, the closing of which permits, the injection of rubber material.

Figure 8:
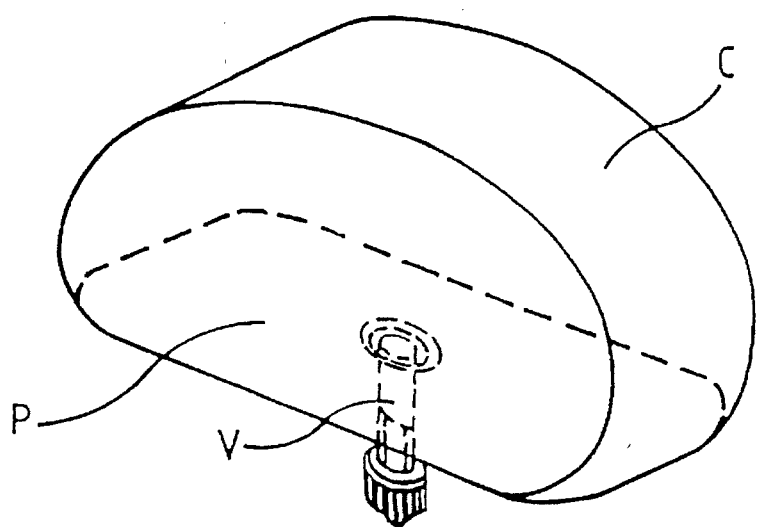
FIG. 8 shows an individual inner tube intended to be placed within each section.

As to the inner tubes C necessary for the inflating of the sectors forming the tire, when they are not provided on the inside with a layer of vulcanized rubber which is impermeable to the inflation air, their shape (FIG. 8) is practically equivalent to the inner shape of a sector S. They are provided with a valve V on their flat face P intended to come into contact with the mounting rim J. These tubes are produced by roto-molding, that is to say by distributing an elastomer, for instance polyurethane, by simultaneous rotation along three axes, within a hollow mold, at high temperature in order to effect the vulcanization.

We claim:

1. A tire formed of a plurality of inflatable and removable pneumatic sectors (S) which are circumferentially adjacent to each other when mounted on an appropriate rim (J) with circularly continuous base, the tire characterized by the fact that each sector (S) comprises a tread (2) connected to four sidewalls (40, 50), two of these sidewalls (50) being circumferentially adjacent to the sidewalls (50) of the adjacent sectors (S) and the other two (40) forming the sidewalls of the tire, these sidewalls (40, 50) terminating in meridian beads not in contact with the mounting rim (J) and reinforced by meridian bead wires (11) and in circumferential beads assuring the mounting of the sectors (S) on the rim (J) and reinforced by circumferential bead wires (10) connected to the meridian bead wires (11) and to which at least one reinforcing armoring (4) of non-stretchable cords or cables is anchored, said reinforcing armoring (4) being radially adjacent to at least one tread (2) reinforcement armoring (8).

2. A tire according to claim 1, characterized by the fact that the reinforcing armoring (4) is formed of at least one ply of radial cords or cables.

3. A tire according to claim 1, characterized by the fact that the reinforcing armoring (4) is composed of at least two plies of cords or cables parallel to each other in each ply and crossed from one ply to the next.

4. A tire according to claim 1, characterized by the fact that, the sector (S) being mounted on the appropriate rim and inflated to its operating pressure, the meridian profile of the reinforcing armoring (4), has, at its points of intersection A with the meridian profile of the reinforcement armoring (8) of the tread (2), which points correspond to the axial ends of said tread reinforcement armoring (8), tangents forming with the axis of rotation of the tire angles φA such that $$\frac{R_A^2 - R_E^2}{2R_A} \tan \phi = \lambda,$$

$R_A$ being the radius of the points A measured with respect to the axis of rotation, $R_E$ being the radius of the points E of the meridian profile of the reinforcing armoring (4) furthest axially from the tire equatorial plane (XX'), λ being the width of the armoring (8) of the tread reinforcement, which tread reinforcement armoring is provided with a high meridian stiffness in flexure.

5. A tire according to claim 1, characterized by the fact that to the meridian bead wires (11) there are anchored the two edges (51) of a carcass armoring (5) formed of at least one ply of non-stretchable cords or cables.

6. A tire according to claim 1, characterized by the fact that around the meridian bead wires (11) there are turned upward the edges (51) of a carcass armoring (5) formed of two plies of non-stretchable cords or cables, crossed from one ply to the next, forming an angle at most equal to 45° with respect to the equatorial plane of the tire.

7. A tire according to claim 5, characterized by the fact that the carcass armoring (5) covers only a surface contained between the meridian bead wires (11) and two planes parallel to the tire equatorial plane and defining the axial width of the reinforcement armoring (8) of the tread (2).

8. A tire according to claim 5, characterized by the fact that the two edges (51) of the carcass armoring (5) are wound around the meridian bead wires (11) to form turn-ups which have a constant height meridianly.

9. A tire according to claim 5, characterized by the fact that the carcass armoring (5) is located, in the top of the sectors, radially to the outside of the reinforcing armoring (4).

10. A tire according to claim 1, characterized by the fact that the meridian bead wires (11) are non-stretchable under the force of tension, have a low stiffness to flexure in their planes and are formed of an assembly of cords or cables braided to each other or of an assembly obtained by winding a cord or cable in order to form a plurality of turns.

11. A tire according to claim 1, characterized by the fact that the circumferential bead wires (10) are of great stiffness in flexure and are formed of rods, tubes or bands of steel.

12. A tire according to claim 1, characterized by the fact that, in each sector (S), the meridian bead wires (11) and the circumferential bead wires (10) are a single bead wire (1).

13. A tire according to claim 1, characterized by the fact that each circumferential bead wire (10) is a hollow tube, a rod or a band of steel (101) turned up on itself radially to the inside in order to form two turn-ups (102) themselves bent perpendicularly to form two threaded cylindrical portions (103).

14. A tire according to claim 1, characterized by the fact that each sector (S) is provided on the inside with a vulcanized rubber which is impermeable to the inflation air, which permits the use of the tire without inner tube when the sector is inflated.

15. A tire according to claim 1, characterized by the fact that the circumferentially adjacent sectors (S) are inflated to their operating pressure by a single inner tube.

16. A tire according to claim 1, characterized by the fact that each sector (S) is inflated to its operating pressure by means of an individual inner tube (C) of appropriate shape.

17. A tire according to claim 14, characterized by the fact that, at the level of the equatorial plane of the tire formed by the sector (S), the difference between the distance $R_s$ separating the axis of rotation of the tire from the point of the reinforcing armoring (4) furthest from said axis and the distance $R_m$ separating said axis from the point of the meridian bead wires (11) furthest from said axis is at least equal to 0.2 $(R_s-R_c)$, $R_c$ being the radius of the circumferential bead wires (10), the circumferentially adjacent sidewalls (50) respectively of two adjacent sectors being in contact over a height (h) equal to at least 0.3 $(R_s-R_c)$ measured perpendicular to the axial extent of the meridian bead wires (11).

18. A tire according to claim 15, characterized by the fact that, at the level of the equatorial plane of the tire formed by the sectors (S), the difference between the distance $R_s$ separating the axis of rotation of the tire from the point of the reinforcing armoring (4) furthest from said axis and the distance $R_m$ separating said axis from the point of the meridian bead wires (11) furthest from said axis is between 0.1 $(R_s-R_c)$ and 0.5 $(R_s-R_c)$, $R_c$ being the radius of the circumferential bead wires (10).

19. A tire according to claim 1, characterized by the fact that the sidewalls of two circumferentially adjacent sectors (S) which face each other are provided in the one case with a groove (52) and in the other case with a corresponding protrusion (53) which fits in said groove (52).

20. A tire according to claim 19, characterized by the fact that the groove (52) and the protrusion (53) have continuous curved traces.

21. A tire according to claim 19, characterized by the fact that the groove (52) and the protrusion (53) have undulated or zig-zag traces, the center axes of these traces being curved.

22. A tire according to claim 1, characterized by the fact that in each sector (S) one of the sidewalls (50) circumferentially adjacent to a sidewall (50) of an adjacent sector (S) is provided with a layer of self-vulcanizing rubber mix of slight thickness, reinforced by a steel wire arranged spirally in the plane of the layer and having a visible end.

23. An assembly formed of a tire with a plurality of inflatable and removable pneumatic sectors (S) which are circumferentially adjacent to each other mounted on an appropriate rim (J) with circularly continuous base, characterized by the fact that a) each sector (S) comprises a tread (2) connected to four sidewalls (40, 50), two of these sidewalls (50) being circumferentially adjacent to the sidewalls (50) of the adjacent sectors (S) and the other two (40) forming the sidewalls of the tire, these sidewalls (40, 50) terminating in meridian beads not in contact with the mounting rim (J) and reinforced by meridian bead wires (11) and in circumferential beads assuring the mounting of the sectors (S) on the rim (J) and reinforced by circumferential bead wires (10) connected to the meridian bead wires (11) and to which at least one reinforcing armoring (4) of non-stretchable cords or cables is anchored, said reinforcing armoring (4) being radially adjacent to at least one tread (2) reinforcement armoring (8); and b) the rim (J) is provided with a rim bottom (30), seats (31), and flanges (32) turned radially towards the inside and made circumferentially discontinuous by recesses (33), the circumferential beads of each sector (S) resting on the seats (31) of the rim (J) radially on the inside for reversed hooking.

24. An assembly formed of a tire with a plurality of inflatable and removable pneumatic sectors (S) which are circumferentially adjacent to each other mounted on an appropriate rim (J) with circularly continuous base, characterized by the fact that a) each sector (S) comprises a tread (2) connected to form sidewalls (40, 50), two of these sidewalls (50) being circumferentially adjacent to the sidewalls (50) of the adjacent sectors (S) and the other two (40) forming the sidewalks of the tire, these sidewalks (40, 50) terminating in meridian beads not in contact with the mounting rim (J) and reinforced by meridian bead wires (11) and in circumferential beads assuring the mounting of the sectors (S) on the rim (J) and reinforced by circumferential bead wires (10) connected to the meridian bead wires (11) and to which at least one reinforcing armoring (4) of non-stretchable cords or cables is anchored, said reinforcing armoring (4) being radially adjacent to at least one tread (2) reinforcement armoring (8); and b) the rim (J) is provided with a rim bottom (30), seats (31), and flanges (32) turned radially towards the outside with tips (320) axially towards the inside, forming with the seats (31) grooves (R) called embedment grooves, the circumferential beads of each sector (S) fitting in the embedment grooves (R).

25. An assembly formed of a tire with a plurality of inflatable and removable pneumatic sectors (S) which are circumferentially adjacent to each other mounted on an appropriate rim (J) with circularly continuous base, characterized by the fact that a) each sector (S) comprises a tread (2) connected to four sidewalls (40, 50) two of these sidewalls (50) being circumferentially adjacent to the sidewalls (50) of the adjacent sectors (S) and the other two (40) forming the sidewalls of the tire, these sidewalls (40, 50) terminating in meridian beads not in contact with the mounting rim (J) and reinforced by meridian bead wires (11) and in circumferential beads assuring the mounting of the sectors (S) on the rim (J) and reinforced by circumferential bead wires (10) connected to the meridian bead wires (11) and to which at least one reinforcing armoring (4) of non-stretchable cords or cables is anchored, said reinforcing armoring (4) being radially adjacent to at least one tread (2) reinforcement armoring (8);

b) each of said circumferential bead wires (101) is a hollow tube, a rod or a band of steel (10) turned up on itself radially to the inside in order to form two turn-ups (102) themselves bent perpendicularly to form two threaded cylindrical portions (103); and c) the rim (J) is provided with a rim bottom (30) and with flanges (32) turned radially towards the outside and having edges extending axially towards the outside, and with seats (31) pierced with orifices (33) through which the threaded cylindrical portions (103) of the circumferential bead wires (10) of each sector (S) pass, with nuts (34) securing the threaded cylindrical portions (103) to the seats (31), thus permitting the firm attachment of the circumferential beads to the rim (J) by means of the nuts (34).

* * * * *